United States Patent
Shimizu et al.

(10) Patent No.: US 12,539,853 B2
(45) Date of Patent: Feb. 3, 2026

(54) VEHICLE CONTROL DEVICE, VEHICLE CONTROL METHOD, AND STORAGE MEDIUM

(71) Applicant: HONDA MOTOR CO., LTD., Tokyo (JP)

(72) Inventors: Takahiro Shimizu, Tokyo (JP); Sho Tamura, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 179 days.

(21) Appl. No.: 18/539,537

(22) Filed: Dec. 14, 2023

(65) Prior Publication Data

US 2024/0199010 A1    Jun. 20, 2024

(30) Foreign Application Priority Data

Dec. 20, 2022   (JP) ................ 2022-203142

(51) Int. Cl.
*B60W 30/12*    (2020.01)
*B60W 60/00*    (2020.01)

(52) U.S. Cl.
CPC ........... *B60W 30/12* (2013.01); *B60W 60/005* (2020.02); *B60W 2552/15* (2020.02);
(Continued)

(58) Field of Classification Search
CPC ............... B60W 30/12; B60W 60/005; B60W 2552/15; B60W 2552/53; B60W 2556/40;
(Continued)

(56) References Cited

U.S. PATENT DOCUMENTS

2022/0281456 A1*  9/2022  Giovanardi .......... G08G 1/0112
2022/0324421 A1* 10/2022  Giovanardi .......... G08G 1/0145

FOREIGN PATENT DOCUMENTS

JP         4978165 B2  *  7/2012
JP       2015-190871       11/2015
(Continued)

OTHER PUBLICATIONS

Machine translation of JP4978165 downloaded from Espacenet Aug. 4, 2025 (Year: 2025).*
(Continued)

*Primary Examiner* — Kito R Robinson
*Assistant Examiner* — Tanya C Sienko
(74) *Attorney, Agent, or Firm* — Amin, Turocy & Watson, LLP

(57) ABSTRACT

According to an embodiment, a vehicle control device includes a first recognizer configured to recognize a first marking for defining a travel lane of a vehicle on the basis of an output of a detection device that has detected a surrounding situation of the vehicle, a second recognizer configured to recognize a second marking for defining the travel lane on the basis of position information and map information of the vehicle, a corrector configured to correct the second marking on the basis of road gradient information of a travel direction of the vehicle, and a lane decider configured to decide on a travel lane of the vehicle on the basis of a comparison result between the first marking and the second marking corrected by the corrector.

8 Claims, 8 Drawing Sheets

(52) U.S. Cl.
CPC ..... *B60W 2552/53* (2020.02); *B60W 2556/40* (2020.02); *B60W 2710/20* (2013.01); *B60W 2720/10* (2013.01)

(58) Field of Classification Search
CPC ......... B60W 2710/20; B60W 2720/10; B60W 2420/403; B60W 2552/30; B60W 60/0053; B60W 30/18009; B60W 60/001; B60W 60/0011
See application file for complete search history.

(56) References Cited

FOREIGN PATENT DOCUMENTS

| | | |
|---|---|---|
| JP | 2020-095435 | 6/2020 |
| JP | 2021-082300 | 5/2021 |

OTHER PUBLICATIONS

"Lane-Level Map-Matching Method for Vehicle Localization Using GPS and Camera on a High-Definition Map", Jeong Min Kang et al., Sensors 2020,20, published Apr. 11, 2020. (Year: 2020).*
"Lane Marking Detection and Reconstruction with Line-Scan Imaging Data" by Lin Li et al., Sensors 2018, 18, published May 20, 2018 (Year: 2018).*
"Vehicle Localization and Control on Roads with Prior Grade Map" Roya Firoozi et al., 2018 IEEE Conference on Decision and Control (CDC) Miami Beach, FL, USA, Dec. 17-19, 2018 (Year: 2018).*
"Detecting and Correcting Map-Matching Errors in Location-Based Intelligent Transport Systems" Nagendra R Velaga et al., 2018 12th WCTR, Jul. 11-15, 2010—Lisbon, Portugal (Year: 2010).*

\* cited by examiner

FIG. 3

| DRIVING MODE | CONTROL STATE | TASK |
|---|---|---|
| MODE A | AUTOMATED DRIVING | FORWARD MONITORING: UNNECESSARY<br>STEERING GRIP: UNNECESSARY |
| MODE B | DRIVING ASSISTANCE | FORWARD MONITORING: NECESSARY<br>STEERING GRIP: NECESSARY |
| MODE C | DRIVING ASSISTANCE | FORWARD MONITORING: NECESSARY<br>STEERING GRIP: NECESSARY |
| MODE D | DRIVING ASSISTANCE | FORWARD MONITORING: NECESSARY<br>AT LEAST CERTAIN DEGREE OF<br>DRIVING OPERATION IS NECESSARY |
| MODE E | MANUAL DRIVING | FORWARD MONITORING: NECESSARY<br>DRIVING OPERATION IS NECESSARY<br>TOGETHER WITH STEERING AND<br>ACCELERATION/DECELERATION |

TASK: LIGHT ↑
↓ TASK: HEAVY

VEHICLE CONTROL DEVICE, VEHICLE CONTROL METHOD, AND STORAGE MEDIUM

CROSS-REFERENCE TO RELATED APPLICATION

Priority is claimed on Japanese Patent Application No. 2022-203142, filed Dec. 20, 2022, the content of which is incorporated herein by reference.

BACKGROUND

Field of the Invention

The present invention relates to a vehicle control device, a vehicle control method, and a storage medium.

Description of Related Art

In recent years, efforts to provide access to sustainable transportation systems have been increasingly active in consideration of vulnerable individuals among participants in transportation. In pursuit of this realization, research and development on driving assistance technology are being emphasized to further improve the safety and convenience of transportation. In relation to this, technology for obtaining a current position of a vehicle by performing map matching in accordance with a variation state of a road gradient during traveling, matching using features, and matching with a map on the basis of three-dimensional points obtained from sensors when a position of a host vehicle is displayed on the map is known (for example, see Japanese Unexamined Patent Application, First Publication Nos. 2015-190871, 2021-82300, and 2020-95435).]

SUMMARY

Meanwhile, in driving assistance technology, when deviation occurs in comparison between a first road marking recognized by a detection device that recognizes a surrounding situation and a second road marking acquired from map information on the basis of the position of the vehicle detected by a position sensor, there is a problem that it may be difficult to determine whether or not the road gradient is caused by the deviation and it may be difficult to appropriately decide on the travel lane of the vehicle.

In order to solve the above problems, an objective of an aspect of the present invention is to provide a vehicle control device, a vehicle control method, and a storage medium that can more appropriately decide on a travel lane. In turn, it will contribute to the development of a sustainable transportation system.

A vehicle control device, a vehicle control method, and a storage medium according to the present invention adopt the following configurations.

(1): According to an aspect of the present invention, there is provided a vehicle control device including: a first recognizer configured to recognize a first marking for defining a travel lane of a vehicle on the basis of an output of a detection device that has detected a surrounding situation of the vehicle: a second recognizer configured to recognize a second marking for defining the travel lane on the basis of position information and map information of the vehicle; a corrector configured to correct the second marking on the basis of road gradient information of a travel direction of the vehicle; and a lane decider configured to decide on a travel lane of the vehicle on the basis of a comparison result between the first marking and the second marking corrected by the corrector.

(2): In the above-described aspect (1), the corrector corrects a position of the second marking on the basis of road gradient information of the second marking included in the map information.

(3): In the above-described aspect (1), the corrector corrects the travel lane of the vehicle defined by the second marking on the basis of the road gradient information.

(4): In the above-described aspect (1), the vehicle control device further includes a driving controller configured to execute driving control for controlling one or both of steering and a speed of the vehicle on the basis of the travel lane decided on by the lane decider, wherein the driving control includes a first driving mode and a second driving mode having a heavier task imposed on a driver of the vehicle than the first driving mode or having a lower driving assistance degree for the driver than the first driving mode, and wherein the driving controller switches the driving mode from the first driving mode to the second driving mode when a deviation degree between the first marking and the second marking is greater than or equal to a threshold value in a state in which the first driving mode is being executed.

(5): In the above-described aspect (1), the corrector corrects the second marking when a gradient degree included in the road gradient information is greater than or equal to a threshold value.

(6): In the above-described aspect (1), the corrector suppresses correction of the second marking when the vehicle is located in a gradient segment and a gradient change point is not located within a prescribed distance in the travel direction of the vehicle.

(7): According to an aspect of the present invention, there is provided a vehicle control method including: recognizing, by a computer, a first marking for defining a travel lane of a vehicle on the basis of an output of a detection device that has detected a surrounding situation of the vehicle: recognizing, by the computer, a second marking for defining the travel lane on the basis of position information and map information of the vehicle; correcting, by the computer, the second marking on the basis of road gradient information of a travel direction of the vehicle; and deciding, by the computer, on a travel lane of the vehicle on the basis of a comparison result between the first marking and the corrected second marking.

(8): According to an aspect of the present invention, there is provided a computer-readable non-transitory storage medium storing a program for causing a computer to: recognize a first marking for defining a travel lane of a vehicle on the basis of an output of a detection device that has detected a surrounding situation of the vehicle; recognize a second marking for defining the travel lane on the basis of position information and map information of the vehicle; correct the second marking on the basis of road gradient information of a travel direction of the vehicle; and decide on a travel lane of the vehicle on the basis of a comparison result between the first marking and the corrected second marking.

According to the above-described aspects (1) to (8), it is possible to more appropriately decide on a travel lane.

BRIEF DESCRIPTION OF THE DRAWINGS

FIG. 3 is a diagram showing an example of corresponding relationships between driving modes, control states of a vehicle, and tasks.

DESCRIPTION OF EMBODIMENTS

Hereinafter, embodiments of a vehicle control device, a vehicle control method, and a storage medium of the present invention will be described with reference to the drawings. Hereinafter, an embodiment in which the vehicle control device is applied to an automated driving vehicle will be described as an example. For example, automated driving is a process of executing driving control by automatically controlling one or both of steering and a speed of the vehicle (independent of an operation of a driver). For example, the driving control may include various types of driving control such as a lane keeping assistance system (LKAS), auto lane changing (ALC), adaptive cruise control (ACC), and a collision mitigation brake system (CMBS). Also, the driving control may include driving assistance control for the driver such as an advanced driver assistance system (ADAS). In the automated driving vehicle, the driving may be controlled according to manual driving of the driver.

[Overall Configuration]

Figure 1:
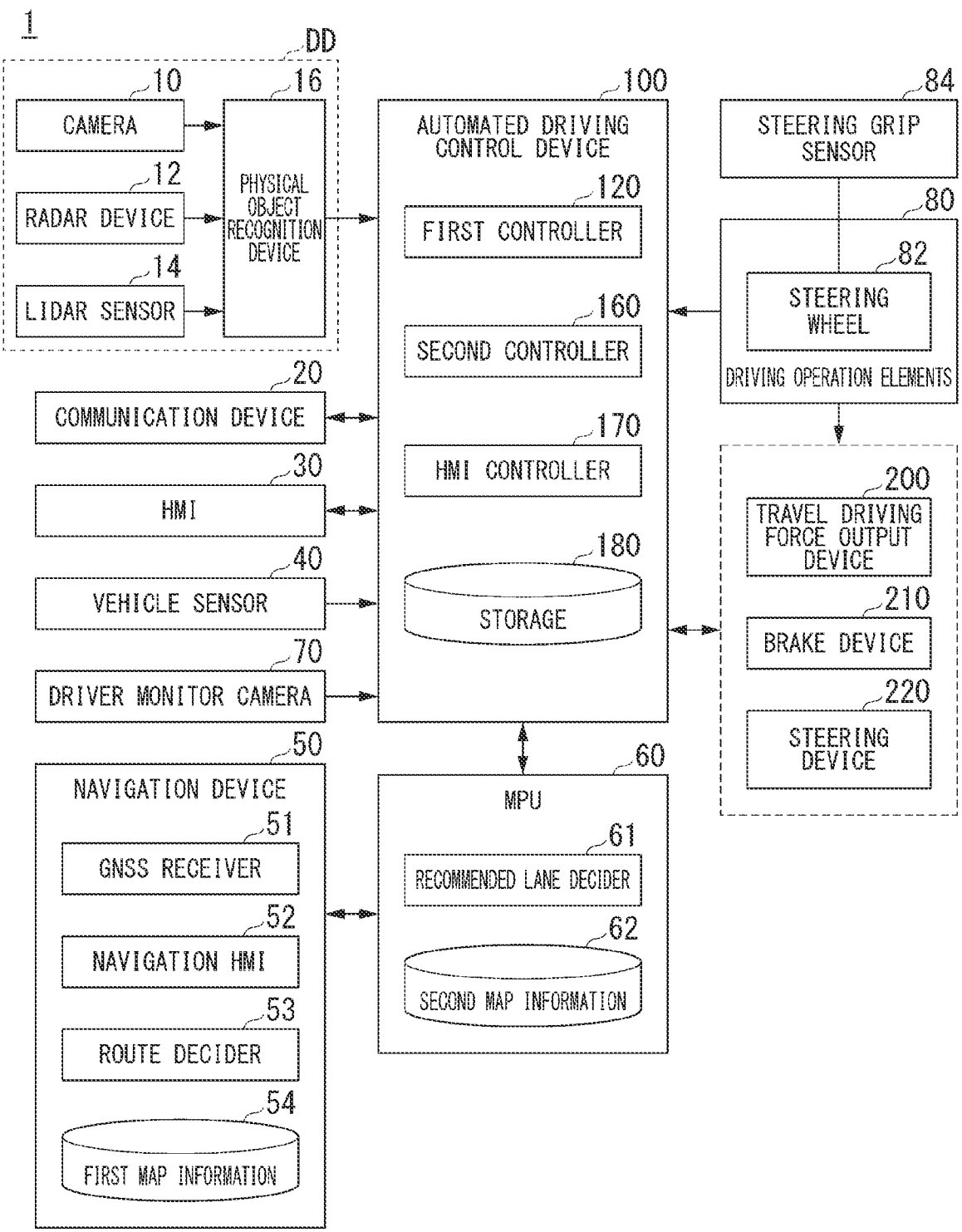
FIG. 1 is a configuration diagram of a vehicle system including a vehicle control device according to an embodiment.

FIG. 1 is a configuration diagram of a vehicle system 1 including the vehicle control device according to the present embodiment. A vehicle (hereinafter referred to as a vehicle M) in which the vehicle system 1 is mounted is, for example, a vehicle such as a two-wheeled vehicle, a three-wheeled vehicle, or a four-wheeled vehicle, and a drive source thereof is an internal combustion engine such as a diesel engine or a gasoline engine, an electric motor, or a combination thereof. The electric motor operates using electric power generated by a power generator connected to the internal combustion engine or electric power that is supplied when a secondary battery (power storage) or a fuel cell is discharged.

For example, the vehicle system 1 includes a camera 10, a radar device 12, a light detection and ranging (LIDAR) sensor 14, a physical object recognition device 16, a communication device 20, a human machine interface (HMI) 30, a vehicle sensor 40, a navigation device 50, a map positioning unit (MPU) 60, a driver monitor camera 70, driving operation elements 80, an automated driving control device 100, a travel driving force output device 200, a brake device 210, and a steering device 220. Such devices and equipment are connected to each other by a multiplex communication line such as a controller area network (CAN) communication line, a serial communication line, or a wireless communication network. The configuration shown in FIG. 1 is merely an example and some of the components may be omitted or other components may be further added. The automated driving control device 100 is an example of a "vehicle control device." A combination of the camera 10, the radar device 12, the LIDAR sensor 14, and the physical object recognition device 16 is an example of a "detection device DD." The detection device DD detects a surrounding situation of the vehicle M. The HMI 30 is an example of an "output."

For example, the camera 10 is a digital camera using a solid-state imaging element such as a charge-coupled device (CCD) or a complementary metal oxide semiconductor (CMOS). The camera 10 is attached to any location on the vehicle M in which the vehicle system 1 is mounted. For example, when the view in front of the vehicle M is imaged, the camera 10 is attached to an upper part of a front windshield, a rear surface of a rearview mirror, a front part of a vehicle body, or the like. When the view to the rear of the vehicle M is imaged, the camera 10 is attached to an upper part of a rear windshield, a back door, or the like. When the views to the side of the vehicle M are imaged, the camera 10 is attached to a door mirror, or the like. For example, the camera 10 periodically and iteratively images the surroundings of the vehicle M. The camera 10 may be a stereo camera.

The radar device 12 radiates radio waves such as millimeter waves around the vehicle M and detects at least a position (a distance to and a direction) of a physical object by detecting radio waves (reflected waves) reflected by the physical object near the vehicle M. The radar device 12 is attached to any location on the vehicle M. The radar device 12 may detect a position and a speed of the physical object in a frequency-modulated continuous wave (FM-CW) scheme.

The LIDAR sensor 14 radiates light to the vicinity of the vehicle M and measures scattered light. The LIDAR sensor 14 detects a distance from an object on the basis of time from light emission to light reception. The radiated light is, for example, pulsed laser light. The LIDAR sensor 14 is attached to any location on the vehicle M.

The physical object recognition device 16 performs a sensor fusion process on detection results of some or all of the camera 10, the radar device 12, and the LIDAR sensor 14 and recognizes a position, type, speed, and the like of a physical object near the vehicle M. Examples of the physical object include other vehicles (for example, nearby vehicles within a prescribed distance from the vehicle M), pedestrians, bicycles, road structures, and the like. The road structures include, for example, road signs, traffic signals, railroad crossings, curbs, median strips, guardrails, fences, and the like. The road structure may include, for example, road surface signs such as road markings (hereinafter simply referred to as "markings") drawn on or affixed to the road surface, pedestrian crossings, bicycle crossings, and stop lines. The physical object recognition device 16 outputs a recognition result to the automated driving control device 100. The physical object recognition device 16 may output detection results of the camera 10, the radar device 12, and the LIDAR sensor 14 to the automated driving control device 100 as they are. In this case, the physical object recognition device 16 may be omitted from the configuration of the vehicle system 1 (specifically, the detection device DD). The physical object recognition device 16 may be included in the automated driving control device 100.

The communication device 20 communicates with another vehicle located in the vicinity of the vehicle M, a terminal device of a user using the vehicle M, or various types of server devices using, for example, a cellular network, a Wi-Fi network, Bluetooth (registered trademark), dedicated short-range communication (DSRC), a local area network (LAN), a wide area network (WAN), a network such as the Internet, or the like.

The HMI 30 outputs various types of information to occupants (including the driver) of the vehicle M and receives input operations from the occupants. The HMI 30 includes, for example, various types of display devices, touch panels, switches, keys, speakers, buzzers, microphones, and the like. The HMI 30 may include a light emitter such as an indicator or lamp that can be lighted or flashed in one or more colors. The HMI 30 is provided at a position where the occupant can see, for example, such as the instrument panel or the steering wheel 82.

The vehicle sensor 40 includes a vehicle speed sensor configured to detect the speed of the vehicle M, an acceleration sensor configured to detect acceleration, a yaw rate sensor configured to detect a yaw rate (for example, a rotational angular velocity around a vertical axis passing through the center of gravity of the vehicle M), a direction sensor configured to detect the direction of the vehicle M, and the like. The vehicle sensor 40 may include a position sensor configured to detect the position of the vehicle M. The position sensor is, for example, a sensor configured to acquire position information (longitude/latitude information) from a Global Positioning System (GPS) device. The position sensor may be a sensor configured to acquire position information using the global navigation satellite system (GNSS) receiver 51 of the navigation device 50. The vehicle sensor 40 may be provided with a tilt sensor configured to detect a tilt of the vehicle M (a tilt in the forward/backward direction or a tilt in the left/right direction with respect to the horizontal direction). A detection result of the vehicle sensor 40 is output to the automated driving control device 100.

For example, the navigation device 50 includes the GNSS receiver 51, a navigation HMI 52, and a route decider 53. The navigation device 50 stores first map information 54 in a storage device such as a hard disk drive (HDD) or a flash memory. The GNSS receiver 51 identifies a position of the vehicle M on the basis of a signal received from a GNSS satellite. The position of the vehicle M may be identified or complemented by an inertial navigation system (INS) using an output of the vehicle sensor 40. The GNSS receiver 51 may be provided in the vehicle sensor 40. The position sensor and the GNSS receiver 51 described above are examples of a "position detector." The navigation HMI 52 includes a display device, a speaker, a touch panel, a key, and the like. The navigation HMI 52 may be partly or wholly shared with the above-described HMI 30. For example, the route decider 53 decides on a route (hereinafter referred to as a route on a map) from the position of the vehicle M identified by the GNSS receiver 51 (or any input position) to a destination input by the occupant using the navigation HMI 52 with reference to the first map information 54. The first map information 54 is, for example, information in which a road shape is expressed by a link indicating a road of a prescribed segment and nodes connected by the link. The first map information 54 may include point of interest (POI) information, and the like. The route on the map is output to the MPU 60. The navigation device 50 may perform route guidance using the navigation HMI 52 on the basis of the route on the map. The navigation device 50 may transmit a current position and a destination to a navigation server via the communication device 20 and acquire a route equivalent to the route on the map from the navigation server. The navigation device 50 outputs a decided route on the map to the MPU 60.

For example, the MPU 60 includes a recommended lane decider 61 and holds second map information 62 in a storage device such as an HDD or a flash memory. The recommended lane decider 61 divides the route on the map provided from the navigation device 50 into a plurality of blocks (for example, divides the route every 100 [m] in a travel direction of the vehicle), and decides on a recommended lane for each block with reference to the second map information 62. For example, the recommended lane decider 61 decides in what lane numbered from the left the vehicle will travel. The lane is defined by markings. The recommended lane decider 61 decides on the recommended lane so that the vehicle M can travel along a reasonable route for traveling to a branching destination when there is a branch point on the route on the map.

The second map information 62 is more accurate than the first map information 54. The second map information 62 includes, for example, information about a road shape, a road structure, and the like. The road shape includes a more detailed road shape than the first map information 54 such as, for example, branching/merging, a tunnel (entrance or exit), a curve path (entrance or exit), curvature of a road or a marking (a curvature radius), road gradient information, the number of lanes, a width, or the like. The road gradient information includes, for example, ascent and descent identification information, information indicating a gradient (inclination) degree (for example, a gradient angle), start and end points of the gradient, a gradient change point (bend point) in which the gradient degree changes, and the like. The above-described information may be stored in the first map information 54. The information about the road structure may include information such as a type of road structure, a position, an orientation in an extension direction of a road, a size, a shape, and a color. In the type of road structure, for example, the marking may be one type, and each of a lane mark, a curb, a median strip, and the like belonging to the markings may be a different type. The type of marking may include, for example, a marking indicating that the lane change is possible and a marking indicating that lane change is not possible. The type of marking, for example, may be set for each segment of the road or lane based on the link and a plurality of types may be set in one link. The second map information 62 may include location information (latitude and longitude) of roads and buildings, address information (address/postal code), facility information, telephone number information, information of prohibition segments in which mode A or B is prohibited to be described below, and the like. The second map information 62 is, for example, a two-dimensional map represented by coordinates on the XY plane (Z=0) projected in the vertical direction of each point.

The second map information 62 may be updated at any time by the communication device 20 communicating with the external device. The first map information 54 and the second map information 62 may be integrally provided as map information. Map information (the first map information 54 and the second map information 62) may be stored in the storage 180.

The driver monitor camera 70 is, for example, a digital camera that uses a solid-state image sensor such as a CCD or a CMOS. The driver monitor camera 70 is, for example, attached to any location on the vehicle M with respect to a position and a direction where the head of the driver sitting in the driver's seat of the vehicle M or another occupant sitting in a passenger or rear seat can be imaged from the front (in a direction in which his/her face is imaged). For example, the driver monitor camera 70 is attached to an upper part of a display device provided on the central portion of the instrument panel of the vehicle M, an upper part of a front windshield, a rear mirror, or the like. The driver monitor camera 70, for example, captures an image including the vehicle cabin periodically and repeatedly.

For example, the driving operation elements 80 include an accelerator pedal, a brake pedal, a shift lever, and other operation elements in addition to a steering wheel 82. A sensor configured to detect an amount of operation or the presence or absence of an operation is attached to the driving operation element 80 and a detection result of the sensor is output to the automated driving control device 100 or some or all of the travel driving force output device 200, the brake device 210, and the steering device 220. The steering wheel 82 is an example of an "operation element that receives a steering operation by the driver." The operation element does not necessarily have to be annular and may be in the form of a variant steering wheel, a joystick, a button, or the like. A steering grip sensor 84 is attached to the steering wheel 82. The steering grip sensor 84 is implemented by a capacitance sensor or the like and outputs a signal for detecting whether or not the driver is gripping the steering wheel 82 (indicating that the driver is in contact with the steering wheel 82 in a state in which a force can be applied) to the automated driving control device 100. In the driving operation element 80, for example, a reaction force device that adjusts an operation amount for steering or a speed according to manual driving of the driver may be provided.

The automated driving control device 100 executes driving control that controls one or both of the steering or speed of the vehicle M on the basis of the surrounding situation of the vehicle M and the like. The automated driving control device 100 includes, for example, a first controller 120, a second controller 160, an HMI controller 170, and a storage 180. Each of the first controller 120, the second controller 160, and the HMI controller 170 is implemented, for example, by a hardware processor such as a central processing unit (CPU) executing a program (software). Also, some or all of the above components may be implemented by hardware (including a circuit; circuitry) such as a large-scale integration (LSI) circuit, an application-specific integrated circuit (ASIC), a field-programmable gate array (FPGA), or a graphics processing unit (GPU) or may be implemented by software and hardware in cooperation. The program may be pre-stored in a storage device (a storage device including a non-transitory storage medium) such as an HDD or a flash memory of the automated driving control device 100 or may be stored in a removable storage medium such as a DVD, a CD-ROM, or a memory card and installed in the storage device of the automated driving control device 100 when the storage medium (the non-transitory storage medium) is mounted in a drive device, a card slot, or the like. The HMI controller 170 is an example of an "output controller."

The storage 180 may be implemented by the above-described various storage devices, an electrically erasable programmable read-only memory (EEPROM), a read-only memory (ROM), a random-access memory (RAM), or the like. The storage 180 stores, for example, programs, various other types of information, and the like. The storage 180 may store map information (the first map information 54 and the second map information 62).

Figure 2:
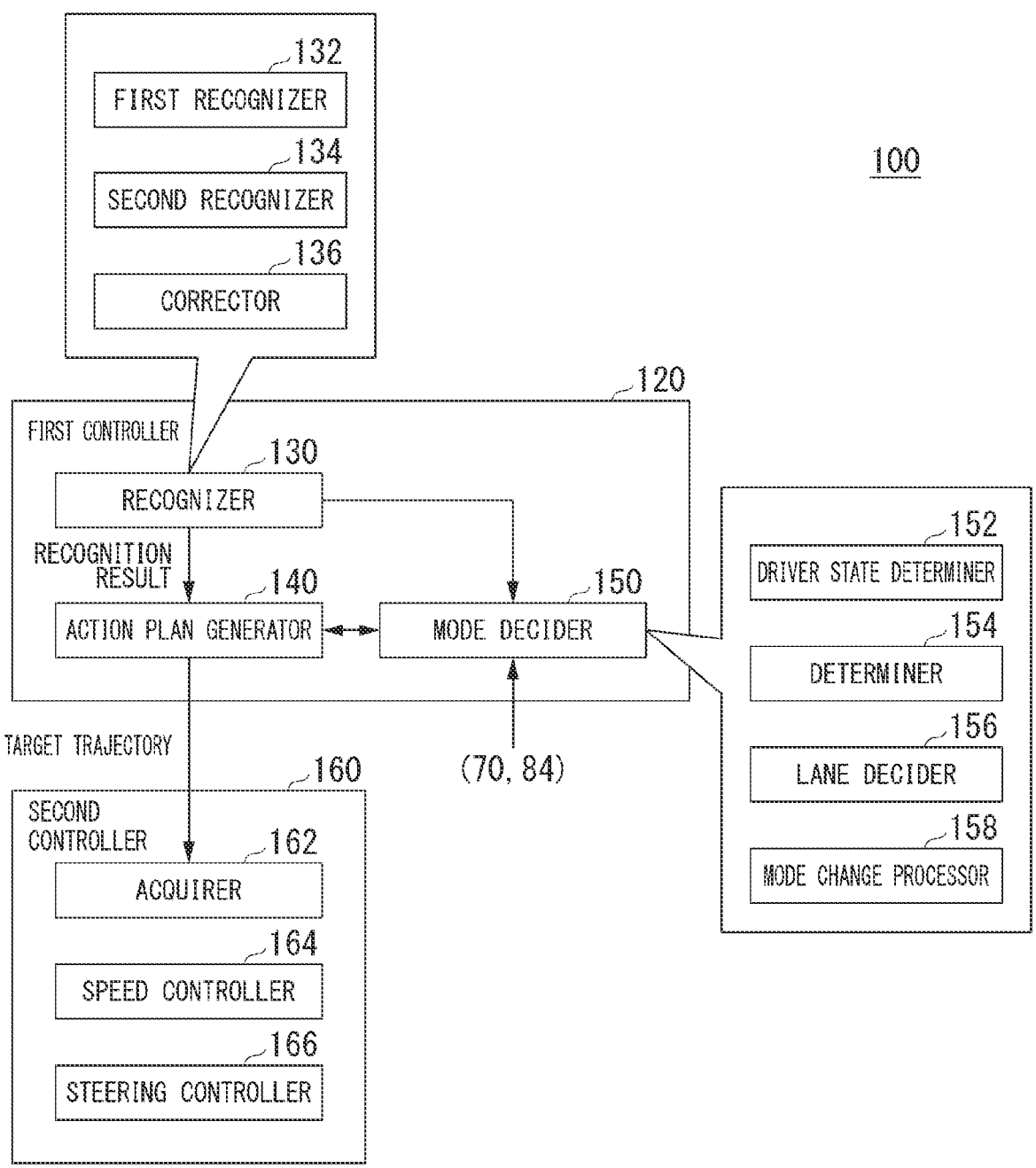
FIG. 2 is a functional configuration diagram of a first controller and a second controller.

FIG. 2 is a functional configuration diagram of the first controller 120 and the second controller 160. The first controller 120 includes, for example, a recognizer 130, an action plan generator 140, and a mode decider 150. The first controller 120 implements, for example, a function of artificial intelligence (AI) and a function of a predetermined model in parallel. For example, an "intersection recognition" function may be implemented by executing intersection recognition based on deep learning or the like and recognition based on previously given conditions (signals, road signs, or the like, with which pattern matching is possible) in parallel and performing comprehensive evaluation by assigning scores to both recognitions. Thereby, the reliability of automated driving is secured. The first controller 120 executes control relating to automated driving of the vehicle M on the basis of, for example, instructions from the MPU 60, the HMI controller 170, or the like. An example of a "driving controller" is a combination of the recognizer 130, the action plan generator 140, and the second controller 160. The driving controller executes driving control for controlling one or both of the steering or speed of the vehicle M on the basis of, for example, a recognition result of the recognizer 130 and the like.

The recognizer 130 recognizes a surrounding situation of the vehicle M on the basis of a recognition result of the detection device DD (information input from the camera 10, the radar device 12, and the LIDAR sensor 14 via the physical object recognition device 16). For example, the recognizer 130 recognizes states of the type, position, speed, and acceleration of the vehicle M and physical objects located near the vehicle M. The type of the physical object may be, for example, a type such as whether the physical object is a vehicle or a pedestrian, or may be a type for identifying each vehicle. The position of the physical object, for example, is recognized as a position of an absolute coordinate system (hereinafter referred to as a vehicle coordinate system) having a representative point of the vehicle M (a center of gravity, a drive shaft center, or the like) as the origin, and is used for control. The position of the physical object may be represented by a representative point such as the center of gravity or a corner of the physical object or a tip portion in the travel direction or may be represented in the expressed region. The speeds include, for example, speeds of the vehicle M and other vehicles (hereinafter referred to as longitudinal speeds) in the travel direction (longitudinal direction) of the travel lane and speeds of the vehicle M and other vehicles (hereinafter referred to as lateral speeds) in the lateral direction of the lane. The "state" of the physical object may include, for example, the acceleration or jerk of the physical object, or the "action state" (for example, whether or not the lane is changing or is about to change) when the physical object is a mobile object such as another vehicle.

The recognizer 130 includes, for example, a first recognizer 132, a second recognizer 134, and a corrector 136. Details of these functions will be described below.

The action plan generator 140 generates an action plan for causing the vehicle M to travel according to driving control of automated driving or the like on the basis of a recognition result of the recognizer 130, a driving mode decided on by the mode decider 150, or the like. For example, the action plan generator 140 generates a future target trajectory along which the vehicle M will automatically travel (independently of the driver's operation) so that the vehicle M can generally travel in the recommended lane decided on by the recommended lane decider 61 and further cope with a surrounding situation of the vehicle M on the basis of a nearby road shape, a marking recognition result, or the like based on the recognition result of the recognizer 130 or a current position of the vehicle M acquired from map information. For example, the target trajectory includes a speed element. For example, the target trajectory is represented by sequentially arranging points (trajectory points) at which the vehicle M is required to arrive. The trajectory points are points at which the vehicle M is required to arrive for each prescribed traveling distance (for example, about several meters [m]) along a road. In addition, a target speed (and target acceleration) for each prescribed sampling time (for example, about 0.x [sec] where x is a decimal number) is generated as a part of the target trajectory. Also, the trajectory point may be a position where the vehicle M is required to arrive at the sampling time for each prescribed sampling time. In this case, information of the target speed (and the target acceleration) is represented by an interval between the trajectory points.

The action plan generator 140 may set an automated driving event in generating the target trajectory. Examples of the event include a constant speed driving event in which the vehicle M travels in the same lane at a constant speed, a tracking driving event for causing the vehicle M to track another vehicle (hereinafter referred to as a preceding vehicle) located within a predetermined distance (for example, within 100 [m]) in front of the vehicle M and closest to the vehicle M, a lane change event for causing the vehicle M to change lanes from a host vehicle lane to an adjacent lane, a branching-point-related movement event for causing the vehicle M to move to a lane in a destination direction at a branching point of a road, a merging-point-related movement event for causing the vehicle M to move to a lane of a main road at a merging point, a takeover event for ending automated driving and performing switching to manual driving, and the like. The action plan generator 140 generates a target trajectory corresponding to the activated event.

The mode decider 150 decides on the driving mode of the vehicle M as any of a plurality of driving modes in which the tasks imposed on the driver (an example of an occupant) are different. The mode decider 150 includes, for example, a driver state determiner 152, a determiner 154, a lane decider 156, and a mode change processor 158.

FIG. 3 is a diagram showing an example of corresponding relationships between the driving modes, the control states of the vehicle M, and the tasks. For example, there are five modes from mode A to mode E as the driving modes of the vehicle M. In the five modes described above, a control state, i.e., a degree of automation of the driving control of the vehicle M, is highest in mode A, lower in the order of mode B, mode C, and mode D, and lowest in mode E. In contrast, a task imposed on the driver is lightest in mode A, heavier in the order of mode B, mode C, and mode D, and heaviest in mode E. Because of a control state that is not automated driving in modes D and E, the automated driving control device 100 is responsible for ending control relating to automated driving and shifting the driving mode to driving assistance or manual driving. The content of the driving modes will be exemplified below.

In mode A, in an automated driving state, neither surroundings monitoring of the vehicle M nor gripping of the steering wheel 82 (hereinafter referred to as a steering grip) is imposed on the driver. The surroundings monitoring includes at least monitoring the front of vehicle M. However, in mode A as well, the driver is required to be in a posture in which driving can be quickly shifted to manual driving in response to a request from a system centering on the automated driving control device 100. The term "automated driving" as used herein indicates that both steering and a speed of the vehicle M are controlled independently of the operation of the driver. The front indicates a space in a travel direction of the vehicle M visually recognized via the front windshield. Mode A is, for example, a driving mode in which the vehicle M travels at a prescribed speed (for example, about 50 [km/h]) or lower on a motorway such as an expressway and which can be executed when a condition in which there is a preceding vehicle, which is the tracking target, or the like is satisfied. Mode A may be referred to as a traffic jam pilot (TJP). When this condition is no longer satisfied, the mode decider 150 changes the driving mode of the vehicle M to mode B.

In mode B, in a driving assistance state, a task of monitoring a forward direction of the vehicle M (hereinafter referred to as forward monitoring) is imposed on the driver, but a task of gripping the steering wheel 82 is not imposed on the driver. In mode C, in a driving assistance state, a forward monitoring task and a task of gripping the steering wheel 82 are imposed on the driver. Mode D is a mode in which a certain degree of driving operation is required for at least one of steering and acceleration/deceleration of the vehicle M is imposed on the driver. For example, in mode D, driving assistance such as adaptive cruise control (ACC) or a lane keeping assist system (LKAS) is performed. In mode E, manual driving in which a task requiring a driving operation for both steering and acceleration/deceleration is imposed on the driver is performed. In both modes D and E, a task of monitoring a forward direction of the vehicle M is naturally imposed on the driver. In the embodiment, for example, when mode A is a "first driving mode," modes B to E are examples of a "second driving mode." When mode B is the "first driving mode," modes C to E are examples of the "second driving mode." That is, the task imposed on the driver in the second driving mode is heavier than that in the first driving mode.

The driving mode is not limited to that illustrated in FIG. 3 and may be defined by other definitions. For example, in the driving modes required for both forward monitoring and steering gripping, there may be a loose or severe threshold value for determining that the steering wheel 82 is gripped. More specifically, it is only necessary for the driver's left or right hand to touch the steering wheel 82 in a certain driving mode, but in another driving mode where the task imposed on the driver is heavier, the driving mode may be defined so that the driver needs to grip the steering wheel 82 with both hands at a strength of the threshold value or more. In addition, driving modes in which the severity of the task imposed on the driver is different may be defined in any way.

The driving assistance degree (in other words, the automated driving control degree) for the driver of the vehicle M may differ depending on the difference in the driving mode. For example, the driving assistance degree (the automated driving control degree) for the driver in the case of the second driving mode is lower than that in the case of the first driving mode. Even in the second driving mode, the driving assistance degree may be reduced as the mode in which the task assigned to the driver becomes heavy when the mode is different. Reducing the driving assistance degree includes, for example, reducing the maximum assistance amount of steering (for example, a maximum torque). Reducing the driving assistance degree may include reducing a speed range (for example, an upper speed limit) that can be supported in speed assistance instead of (or in addition to) the above-described content.

The driver state determiner 152 determines whether or not an occupant (driver) is in a state suitable for driving. For example, the driver state determiner 152 monitors the state of the occupant for the above-described mode change and determines whether or not the state of the occupant is a state corresponding to the task. For example, the driver state determiner 152 performs a posture estimation process by analyzing an image captured by the driver monitor camera 70 and determines whether or not the occupant is in a posture in which the driving cannot be shifted to the manual driving in response to a request from the system. The driver state determiner 152 performs a visual line estimation process by analyzing the image captured by the driver monitor camera 70 and determines whether or not the occupant is monitoring the surroundings (more specifically, the forward direction) of the vehicle M. When it is determined that the state is not corresponding to the task for a prescribed period of time or more, the driver state determiner 152 determines that the occupant is not suitable for driving of the task or that the task relating to the driving mode is not executed by the driver. When it is determined that the state is corresponding to the task, the driver state determiner 152 determines that the occupant is in a state suitable for driving of the task or a state in which the task relating to the driving mode is executed by the driver. The driver state determiner 152 may determine whether or not the occupant is in a state where driving changes are possible.

The determiner 154 compares (matches) a recognition result of the first recognizer 132 with a recognition result of the second recognizer 134 and determines whether or not there is a deviation (difference) in each recognition result on the basis of a comparison result (matching result). The determiner 154 may acquire a deviation degree of each recognition result. Details of the function of the determiner 154 will be described below.

The mode change processor 158 decides on or changes the driving mode executed by the vehicle M on the basis of a determination result of the driver state determiner 152, a determination result of the determiner 154, and the like. For example, the mode change processor 158 changes the driving mode of the vehicle M to a driving mode with a heavier task when the task relating to the decided driving mode is not executed by the driver. For example, in mode A, when the driver is in a posture where he/she cannot shift the driving to manual driving in response to a request from the system (for example, when he/she continues to look outside an allowable area or when a sign that driving is difficult is detected), the mode change processor 158 performs a control process of prompting the driver to shift the driving to manual driving using the HMI 30, causing the vehicle M to gradually stop close to the road shoulder when the driver does not respond, and stopping the automated driving. After the automated driving is stopped, the vehicle M is in a state of mode D or E. Thereby, the vehicle M can be started according to the manual driving of the driver. Hereinafter, the same is true for "stopping the automated driving." When the driver is not performing forward monitoring in mode B, the mode change processor 158 performs a control process of prompting the driver to perform the forward monitoring using the HMI 30, causing the vehicle M to gradually stop close to the road shoulder when the driver does not respond, and stopping the automated driving. When the driver is not performing the forward monitoring or is not gripping the steering wheel 82 in mode C, the mode change processor 158 performs a control process of prompting the driver to perform the forward monitoring and/or grip the steering wheel 82 using the HMI 30, causing the vehicle M to gradually stop close to the road shoulder when the driver does not respond, and stopping the automated driving. Changes in the driving mode based on the determination result of the determiner 154 and the like will be described below.

The second controller 160 controls the travel driving force output device 200, the brake device 210, and the steering device 220 so that the vehicle M passes along the target trajectory generated by the action plan generator 140 at the scheduled times. The second controller 160 includes, for example, an acquirer 162, a speed controller 164, and a steering controller 166. The acquirer 162 acquires information of a target trajectory (trajectory points) generated by the action plan generator 140 and causes a memory (not shown) to store the information. The speed controller 164 controls the travel driving force output device 200 or the brake device 210 on the basis of a speed element associated with the target trajectory stored in the memory. The steering controller 166 controls the steering device 220 in accordance with a degree of curvature of the target trajectory stored in the memory. The processes of the speed controller 164 and the steering controller 166 are implemented by, for example, a combination of feedforward control and feedback control. As an example, the steering controller 166 executes feedforward control according to a curvature radius (or curvature) of the road in front of the vehicle M and feedback control based on a deviation from the target trajectory in combination.

The HMI controller 170 notifies the occupant of prescribed information through the HMI 30. The prescribed information includes, for example, information about traveling of the vehicle M such as information about the state of the vehicle M and information about driving control. The information about the state of the vehicle M includes, for example, a speed, an engine speed, a shift position, and the like of the vehicle M. Information about driving control includes control content in the driving controller, for example, whether or not driving control by automated driving is executed, information for inquiring about whether or not to start automated driving, a situation of driving control by automated driving (for example, driving mode or event content in progress), information about a driving assistance degree, information about the switching of the driving mode, and the like. The prescribed information may include, for example, information about the current position and destination of the vehicle M, and the remaining amount of fuel. The prescribed information may include information irrelevant to travel control of the vehicle M, such as content (for example, movies) stored in a storage medium such as a TV program or a DVD.

For example, the HMI controller 170 may generate an image including the prescribed information described above, cause the display device of the HMI 30 to display the generated image, generate a sound indicating the prescribed information, and cause the generated sound to be output from a speaker of the HMI 30. The HMI controller 170 may cause light emitters such as indicators and lamps included in the HMI 30 to be turned on or flashed in a prescribed color. The HMI controller 170 may cause information received by the HMI 30 to be output to the communication device 20, the navigation device 50, the first controller 120, or the like. The HMI controller 170 may transmit various types of information output to the HMI 30 to a terminal device used by the occupants of the vehicle M via the communication device 20. The terminal device is, for example, a smartphone or a tablet terminal.

The travel driving force output device 200 outputs a travel driving force (torque) for enabling the traveling of the vehicle M to driving wheels. For example, the travel driving force output device 200 includes a combination of an internal combustion engine, an electric motor, a transmission, and the like, and an electronic control unit (ECU) that controls the internal combustion engine, the electric motor, the transmission, and the like. The ECU controls the above-described components in accordance with information input from the second controller 160 or information input from the accelerator pedal of the driving operation element 80.

For example, the brake device 210 includes a brake caliper, a cylinder configured to transfer hydraulic pressure to the brake caliper, an electric motor configured to generate hydraulic pressure in the cylinder, and a brake ECU. The brake ECU controls the electric motor in accordance with the information input from the second controller 160 or the information input from the accelerator pedal of the driving operation element 80 so that brake torque according to a braking operation is output to each wheel. The brake device 210 may include a mechanism configured to transfer the hydraulic pressure generated according to an operation on the brake pedal to the cylinder via a master cylinder as a backup. The brake device 210 is not limited to the above-described configuration and may be an electronically controlled hydraulic brake device configured to control an actuator in accordance with information input from the second controller 160 and transfer the hydraulic pressure of the master cylinder to the cylinder.

For example, the steering device 220 includes a steering ECU and an electric motor. For example, the electric motor changes a direction of steerable wheels by applying a force to a rack and pinion mechanism. The steering ECU drives the electric motor in accordance with the information input from the second controller 160 or the information input from the accelerator pedal of the driving operation element 80 to change the direction of the steerable wheels.

[Recognizer]

Hereinafter, details of the functions of the first recognizer 132, the second recognizer 134, and the corrector 136 of the recognizer 130 will be described.

The first recognizer 132 recognizes markings around the vehicle M on the basis of an output of the detection device DD. For example, the first recognizer 132 recognizes left and right markings LL1 and RL1 for defining the travel lane of the vehicle M. The markings LL1 and RL1 are examples of "first markings." For example, the first recognizer 132 analyzes an image (hereinafter referred to as a camera image) captured by the camera 10, extracts edge points having a large luminance difference from the adjacent pixels in the image, and recognizes the first markings LL1 and RL1 in an image plane by connecting the edge points. The first recognizer 132 converts the positions of the first markings LL1 and RL1 based on a position of a representative point (for example, the center of gravity or center) of the vehicle M into positions of the vehicle coordinate system. In this conversion, the positions of the first markings LL1 and RL1 projected onto the road surface on which the vehicle M is traveling (for example, on the XY plane (Z=0) or on the horizontal plane) are expressed in the coordinate system. The map expressed by this coordinate system becomes a distance measurement map indicating a distance from the position of the vehicle M obtained by projecting each point recognized by the camera image onto the XY plane in the visual line direction from the camera 10. The first recognizer 132 may recognize curvatures (or curvature radii) of the first markings LL1 and RL1 on the basis of the analysis result of the camera image and may recognize the type and content of road signs included in the camera image.

The second recognizer 134, for example, recognizes the left and right markings LL2 and RL2 for defining the travel lane of the vehicle M from the map information on the basis of the position of the vehicle M detected by the position detector. The markings LL2 and RL2 are examples of "second markings." For example, the second recognizer 134 acquires the position information of the vehicle M detected by the position detector, refers to the second map information 62 on the basis of the acquired position information, and recognizes the second markings LL2 and RL2 for defining the lane located at the position of the vehicle M from the second map information 62. The second recognizer 134 may recognize curvatures (or curvature radii) and road gradient information of the markings LL2 and RL2 from the second map information 62.

Figure 4:
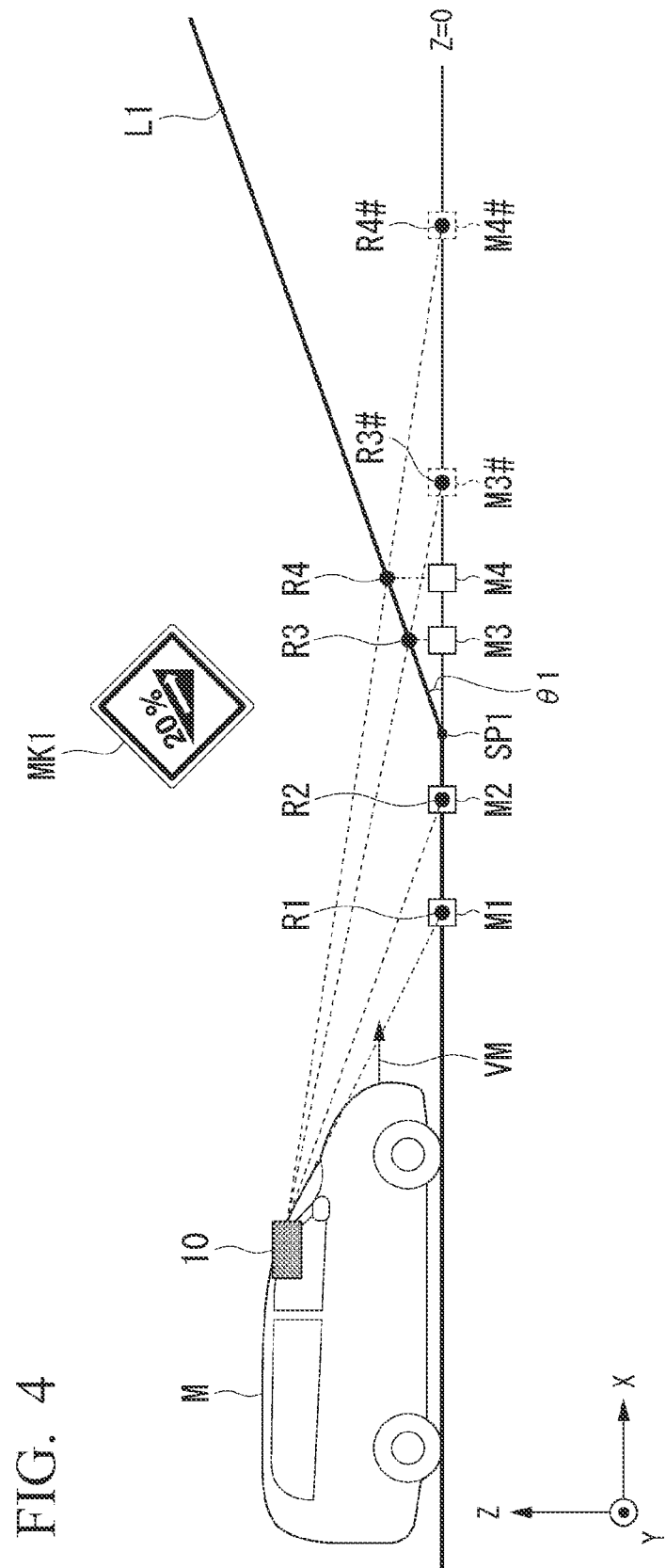
FIG. 4 is a diagram for describing content of a process of a corrector.

The corrector 136 corrects the second markings LL2 and RL2 recognized by the second recognizer 134 to generate corrected second markings LL2# and RL2#, on the basis of the road gradient information in the travel direction of the vehicle. The road gradient information is acquired from map information (for example, the second map information 62). FIG. 4 is a diagram for describing content of a process of the corrector 136. In the example of FIG. 4, the vehicle M is assumed to be traveling at a speed VM in an extension direction (an X-axis direction in FIG. 4) of a lane L1. In the example of FIG. 4, it is assumed that there is an ascent (upward gradient) of the gradient angle θ1 in the travel direction of the vehicle M. In the example of FIG. 4, points R1 to R4 indicate points on the first marking for defining the lane L1 recognized by the first recognizer 132 using the camera image and points M1 to M4 indicate points on the second marking for defining the lane L1 recognized by the second recognizer 134 using map information.

In the example of FIG. 4, for example, when the vehicle M is traveling in front of a position where an ascent starts (a gradient change point SP1), flat points R1 and R2 that have no gradient recognized from the camera image of the camera 10 that images the front of the vehicle M match the points M1 and M2 on the second marking obtained from the map information when there is no problem in the map information (or a map difference), camera performance, or the like. However, the points expressed on the distance measurement map obtained in a coordinate conversion process of the first recognizer 132 for the points R3 and R4 recognized from the camera image become points R3# and R4# in the projection in the visual line direction from the camera 10 at points R3 and R4 where there is a gradient ahead of the gradient change point SP1 as seen from the vehicle M, but the points become points M3 and M4 according to projection in the vertical direction in the map obtained from the map information by the second recognizer 134. In this situation, when the first marking and the second marking deviate, it is difficult to conventionally determine whether the deviation is due to map accuracy or camera performance, or the deviation is due to gradient, and it is difficult to appropriately decide on the travel lane. Therefore, in the embodiment, the corrector 136 corrects positions of the second markings LL2 and RL2 obtained from the map information when there is a gradient in the travel direction of the vehicle M on the basis of the road gradient information in the travel direction of the vehicle M.

The road gradient information is acquired simultaneously when the second markings LL2 and RL2 are acquired from the map information on the basis of the position information of the vehicle M. The road gradient information is acquired every time there is a gradient change and may be acquired not only for each marking but also for each lane defined by the markings and for each road including the lane. The road gradient information may be acquired by the first recognizer 132 recognizing an image of a road sign MK1 provided near the gradient segment (within a prescribed distance) included in the imaging image of the camera. The road gradient information may be acquired from the tilt sensor included in the vehicle sensor 40 when the vehicle M is located in the gradient segment. For example, the corrector 136 prioritizes road gradient information obtained from map information and acquires road gradient information obtained from the first recognizer 132 or the vehicle sensor when it is difficult to acquire the road gradient information from the map information. By acquiring the road gradient information preferentially from the map information, it is possible to acquire road gradient information of the gradient segment located in the travel direction, even if it is difficult to recognize the road sign MK1 installed in the gradient segment from the camera image or even if the vehicle M is not traveling in the gradient segment (even if the vehicle M is traveling in front of a gradient change point SP1).

The corrector 136 converts the second marking into a three-dimensional marking on the basis of a gradient degree included in the road gradient information and generates a distance measurement map on the basis of the three-dimensional marking obtained in the conversion. Specifically, the corrector 136, for example, converts the second markings LL2 and RL2 of the gradient segment on the two-dimensional map into three-dimensional markings on the basis of the gradient degree and converts each point on the three-dimensional marking obtained in the conversion into a point of a coordinate system indicating a distance from the vehicle M to generate the distance measurement map. Thereby, in the example of FIG. 4, the points M3 and M4 on the second marking corresponding to the points R3 and R4 are located at points M3# and M4# in coordinate conversion based on a gradient angle θ1 indicating the gradient degree.

In addition to the above-described correction process, the corrector 136 may perform correction so that similar results are achieved using a predetermined coordinate conversion matrix, a function, or the like, set the second markings LL2 and RL2 and the gradient angle θ1 as an input, and perform correction using a trained model whose output is corrected second markings LL2# and RL2# after the conversion. The trained model may be generated according to AI functions such as machine learning (a neural network) and deep learning using the second marking and road gradient information provided in advance and true value (correct answer) data and may be acquired from an external server capable of being connected via the communication device 20.

The corrector 136 performs the above-described correction on points of the second markings LL2 and RL2 included in the gradient segment and generates the corrected second markings LL2# and RL2#. For example, when there is an ascent in the travel direction of the vehicle M, the second marking included in the gradient segment obtained from the map information becomes a marking whose scale is increased (extended) in an extension direction in accordance with a gradient angle in the above-described correction process.

Figure 5:
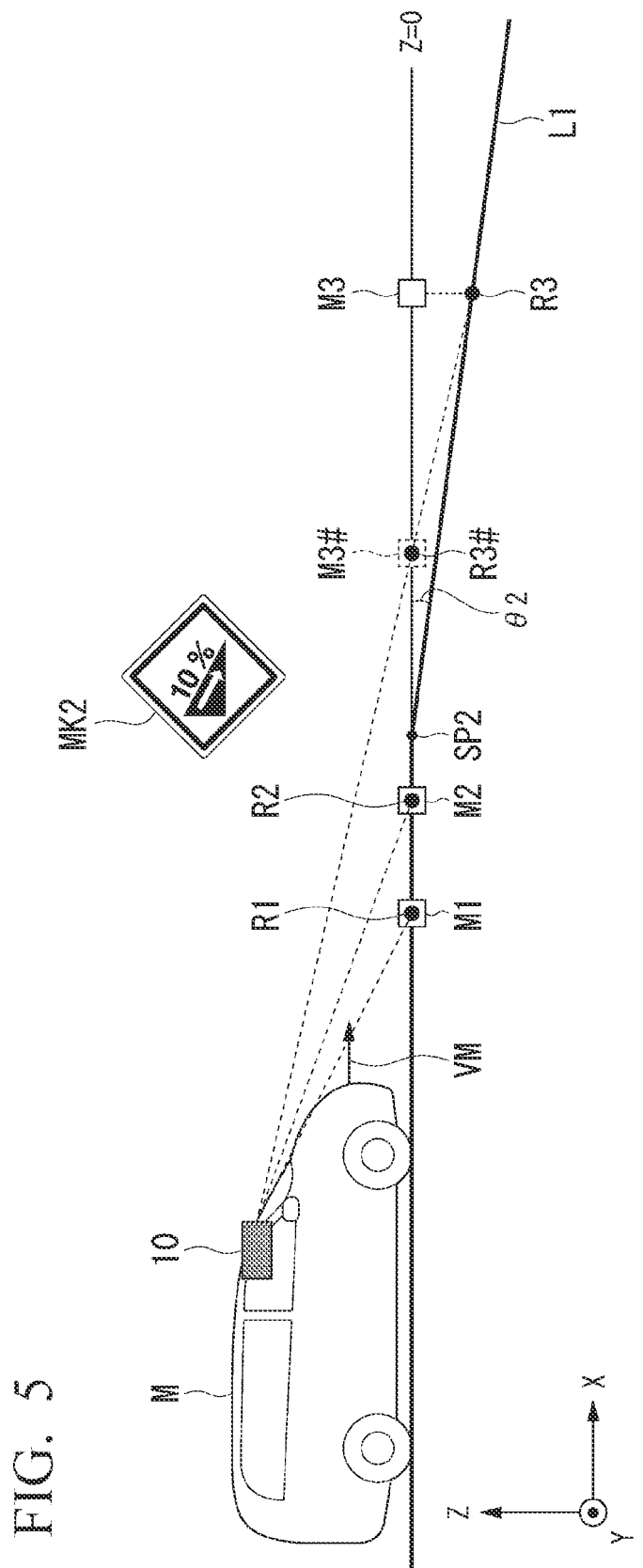
FIG. 5 is a diagram for describing correction when there is a descent (downward gradient) in a travel direction of a vehicle.

FIG. 5 is a diagram for describing correction when there is a descent (a downward gradient) in the travel direction of the vehicle M. When there is a descent in the travel direction of the vehicle M, for example, when the vehicle M is traveling in front of a position where the descent starts (a gradient change point SP2), flat points R1 and R2 that have no gradient match the points M1 and M2 on the second marking obtained from the map information when there is no problem in the map information (or a map difference), camera performance, or the like as in FIG. 4. However, the point expressed on the distance measurement map obtained in the coordinate conversion process of the first recognizer 132 for the point R3 recognized from the camera image becomes a point R3# in the projection in the visual line direction from the camera 10 at the point R3 where there is a gradient ahead of the gradient change point SP2 as seen from the vehicle M, but the point becomes the point M3 according to projection in the vertical direction in the map obtained from the map information by the second recognizer 134. Therefore, the corrector 136 converts the second marking into a three-dimensional marking on the basis of the road gradient information as in the case of the ascent and generates a distance measurement map on the basis of the three-dimensional marking obtained in the conversion. Thereby, in the example of FIG. 5, the point M3 on the second marking corresponding to the point R3 is located at a point M3# in coordinate conversion based on a gradient angle θ2 indicating the gradient degree. The corrector 136 performs the above-described correction on points of the second markings LL2 and RL2 included in the gradient segment and generates the second markings LL2# and RL2#. For example, when there is a descent in the travel direction of the vehicle M, the second marking included in the gradient segment obtained from the map information is a marking whose scale is decreased (reduced) in the extension direction in accordance with the gradient angle in the above-described correction process.

The corrector 136 may perform the above-described correction process when the gradient angles θ1 and θ2 are greater than or equal to a threshold value and suppress the correction process when the gradient angles θ1 and θ2 are less than the threshold value. Thereby, the process of the corrector 136 can be reduced. The threshold values for the ascent and the descent may be the same as or different from each other.

The corrector 136 may correct the second markings LL2 and RL2 in a unit of a lane defined by the second markings LL2 and RL2 (a lane of one pair of second markings LL2 and RL2) instead of each marking. Furthermore, the corrector 136 may perform the correction process for each road including a plurality of lanes. Thereby, the correction process can be simplified and the processing load can be reduced. Whether to perform the correction for each marking, whether to perform the correction for each lane, or whether to perform the correction for each road may be decided on the basis of, for example, the road shape, the speed of the vehicle M, and the like.

Figure 6:
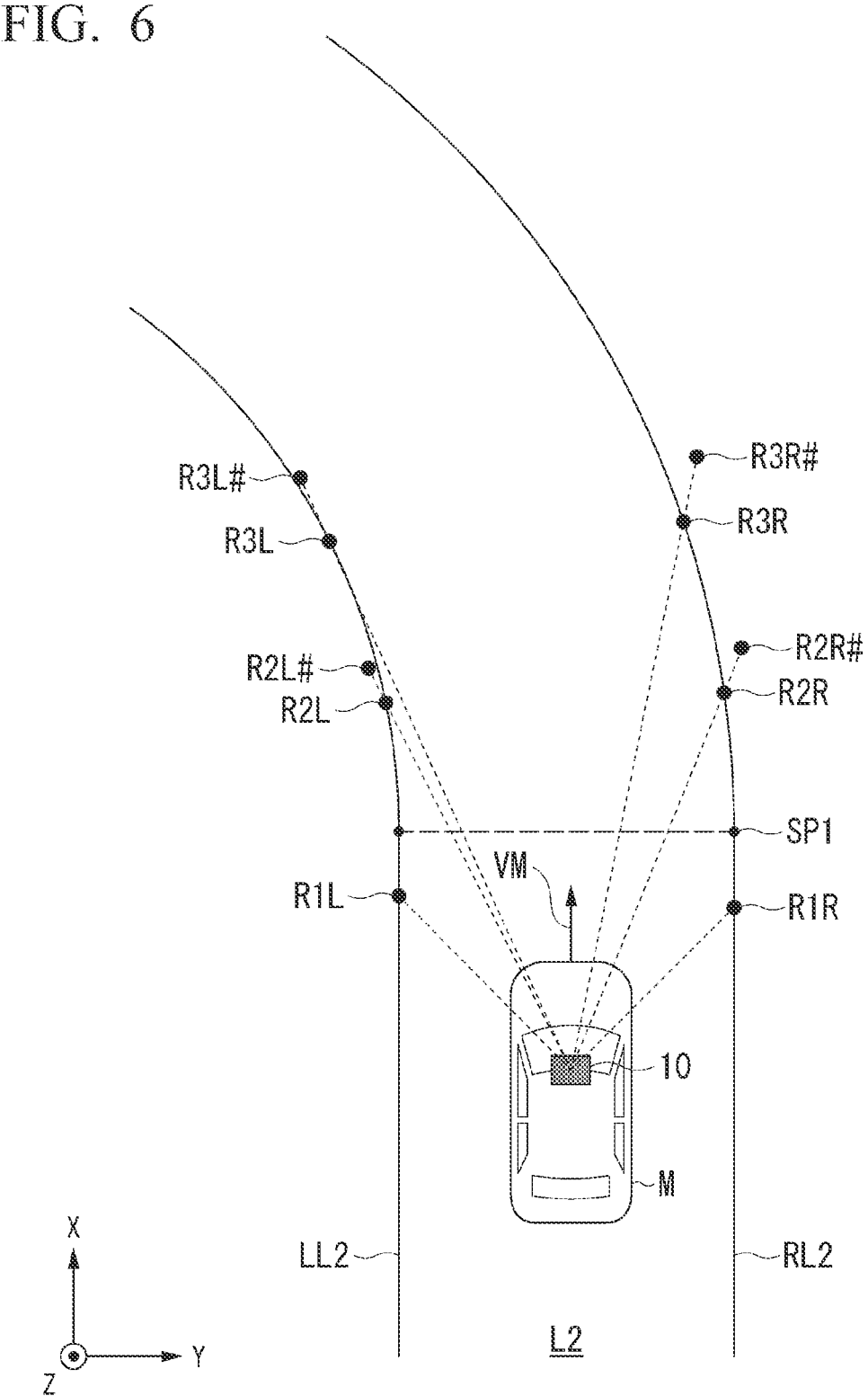
FIG. 6 is a diagram for describing correction when a gradient segment is a curved road.

The corrector 136 may correct the second marking according to the curvature when the gradient segment is a curve path having curvature greater than or equal to a prescribed value (in other words, the curvature radius may be less than the prescribed value). FIG. 6 is a diagram for describing correction when the gradient segment is a curve path. In the example of FIG. 6, the vehicle M traveling in the lane L2 at a speed VM is shown. The markings for defining the lane L2 shown in FIG. 6 are assumed to be the second markings LL2 and RL2 acquired from the map information by the second recognizer 134. The curve path of the lane L2 is assumed to be an ascent having a gradient angle greater than or equal to the threshold value for performing the correction. Points R1L to R3L shown in FIG. 6 are points on the first marking LL1 on the left side of the vehicle M recognized by the first recognizer 132 using a camera image and points R1R to R3R are points on the first marking RL1 on the right side of the vehicle M recognized by the first recognizer 132.

As shown in FIG. 6, points R2L#, R3L#, R2R#, and R3R# are obtained by performing coordinate conversion of the recognition points R2L, R3L, R2R, and R3R of the first marking of the gradient segment into a distance measurement map (conversion into a vehicle coordinate system) by the first recognizer 132. Therefore, the deviation in the gradient segment is likely to increase in comparison between the first markings LL1 and RL1 and the second markings LL2 and RL2 in the vehicle M traveling in front of the gradient change point SP1. Furthermore, because the position after the coordinate conversion differs in accordance with the curvature, the deviation degree is also likely to increase. Therefore, when there is a curve path in the gradient segment, the corrector 136 corrects the positions of the second markings LL2 and RL2 in accordance with the gradient degree and the magnitude of the curvature in the travel direction to generate a distance measurement map.

In the case of a curve path, the curvature of the left and right markings of the lane L2 may be different or the gradient may be in the lateral direction (the road width direction) of a bank or the like. Therefore, the corrector 136 may correct the positions of the second markings LL2 and RL2 in correspondence with the curvature of each marking and the gradient degree in the lateral direction (the road width direction). By performing the correction of the above-described second marking, the first marking and the second marking can be compared in a state in which the influence from the gradient and curvature of the road is less and the travel lane of the vehicle can be more appropriately decided on in the mode decider 150.

[Mode Decider]

Hereinafter, the determiner 154, the lane decider 156, and the mode change processor 158 will be mainly described. The determiner 154 compares the first markings LL1 and RL1 recognized by the first recognizer 132 with the corrected second markings LL2# and RL2# recognized by the second recognizer 134 and corrected by the corrector 136 and determines whether or not there is a deviation between the markings. When the gradient angle is less than the threshold value and the correction process of the corrector 136 has not been performed, a similar comparison process is performed for the first markings LL1 and RL1 and the second markings LL2 and RL2.

Figure 7:
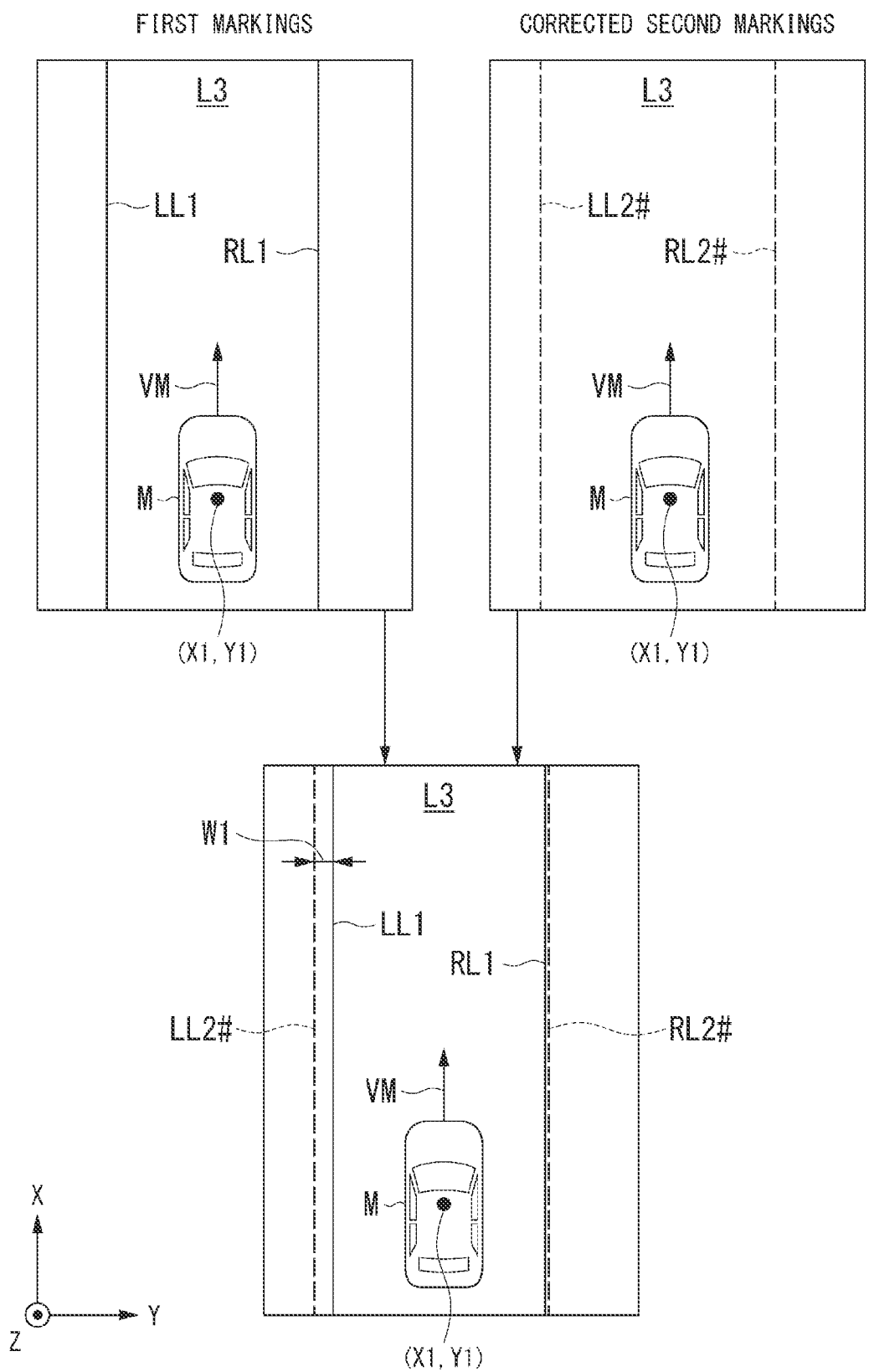
FIG. 7 is a diagram for describing a process of a determiner.

FIG. 7 is a diagram for describing the process of the determiner 154. In the example of FIG. 7, it is assumed that the vehicle M is traveling in an extension direction of a lane L3 (an X-axis direction in FIG. 7) at a speed VM. In FIG. 7, the first markings LL1 and RL1 recognized by the first recognizer 132 in the plane (XY plane) of the vehicle coordinate system and the corrected second markings LL2# and RL2# recognized by the second recognizer 134 and corrected by the corrector 136 on the basis of the gradient degree are shown. That is, the markings are shown as a distance measurement map in a two-dimensional plane (XY plane). The position (X1 and Y1) shown in FIG. 7 indicates a representative point of the vehicle M when the marking is recognized by the first recognizer 132 and the second recognizer 134.

The determiner 154 superimposes a position (X1, Y1) in the XY plane, performs a superimposition process so that the direction of the vehicle M is the same, and acquires a deviation degree to each of the left and right (the markings LL1 and LL2# and the markings RL1 and RL2#). The deviation may be, for example, a deviation in a lateral position (the Y-axis direction in FIG. 7) (for example, a lateral deviation amount W1 between the markings LL1 and LL2# in FIG. 7), a difference in a longitudinal position (a long or short distance in the X-axis direction in FIG. 7), or a combination thereof. The deviation may be an angle (a deviation angle) formed between the markings LL1 and LL2# or an angle formed by the markings RL1 and RL2# in place of (or in addition to) the above-described content. The deviation may be an average in the lateral deviation amount or the deviation angle of each of the left and right. The determiner 154 increases the deviation degree as the lateral deviation amount W1 or the deviation angle increases.

The determiner 154 determines that the first marking and the second marking do not deviate (or match) when the deviation degree between the markings LL1 and LL2# and the markings RL1 and RL2# is less than the threshold value and determines that the first marking and the second marking deviate (or do not match) when the deviation degree is greater than or equal to the threshold value. Also, the determiner 154 may determine that the first marking and the second marking deviate when a state in which the deviation degree is greater than or equal to the threshold value continues for a prescribed period of time or more. Thereby, because it is possible to suppress the frequent switching of the determination result of the deviation degree, the driving control based on the determination result can be further stabilized. Thus, by comparing the first marking and the corrected second marking, the deviation (error) caused by the road gradient can be suppressed and the comparison can be made more accurately.

The lane decider 156 decides on the travel lane of the vehicle M on the basis of a determination result of the determiner 154. For example, when the determiner 154 determines that the deviation degree between the first markings LL1 and RL1 and the second markings LL2# and RL2# is less than the threshold value (when they match), the lane decider 156 decides on the lane defined by the second markings as the travel lane. When the deviation degree between the first markings and the second markings is greater than or equal to the threshold value (when they do not match), the lane decider 156 decides on the lane defined by the first markings of the first and second markings as the travel lane. The lane decider 156 may interpolatively use the information of the second markings when the deviation degree is greater than or equal to the threshold value.

When automated driving or driving assistance is executed on the basis of the execution driving mode, the action plan generator 140 generates a target trajectory for the vehicle M to travel in the travel lane decided on by the lane decider 156, and outputs the generated target trajectory to the second controller 160 to execute driving control.

The mode change processor 158 changes the driving mode on the basis of, for example, a determination result of the determiner 154. For example, when both the left and right markings of the first markings and the second markings match (the deviation degree is less than a threshold value) and another condition in which the first driving mode is executable is satisfied, the mode change processor 158 changes the mode from the second driving mode to the first driving mode, makes a change to a mode in which a task imposed on the driver is light during the second driving mode, or causes the first driving mode being executed to continue. In a state in which the first driving mode is being executed, the mode change processor 158 executes a process of switching the driving mode from the first driving mode to the second driving mode (for example, modes C to E) when the deviation degree to at least one of the left and right of the first markings and the second markings is greater than or equal to a threshold value. The mode change processor 158 may suppress switching from the first driving mode to the second driving mode until the state in which the deviation degree is greater than or equal to the threshold value continues for a prescribed period of time or more. Thereby, the change in the driving mode when the deviation degree is temporarily greater than or equal to the threshold value is suppressed, and more stable driving control can be implemented. The mode change processor 158 may switch each of the plurality of modes included in the second driving mode stepwise to a mode in which the task imposed on the occupant becomes heavier in accordance with the duration of the state in which the deviation degree is greater than or equal to the threshold value. In this case, the mode is switched to a mode in which a heavier task is imposed when the duration is longer.

When the mode is switched from the first driving mode to the second driving mode due to a deviation between the first marking and the second marking, the HMI controller 170 may cause the HMI 30 to output information indicating the reason for switching in addition to switching of the driving mode. The HMI controller 170 may cause the HMI 30 to output information about a task imposed on the occupant for switching the driving mode (for example, the forward monitoring or gripping of the steering wheel 82). The HMI controller 170 may cause the HMI 30 to output information about an assistance state corresponding to a driving assistance degree when a driving assistance degree for the driver of the vehicle M is changed by switching the driving mode from the first driving mode to the second driving mode according to the deviation between the first marking and the second marking. The HMI controller 170 may change a light emitting mode (a display mode) of a light emitter such as an indicator or lamp included in the HMI 30 in accordance with a change in the driving mode or a change in the assistance state. The light emitting mode is, for example, a mode of lighting, flashing, a flashing cycle, a light emission color, or the like. Thereby, the driver can clearly ascertain a change in the driving assistance state.

[Processing Flow]

Figure 8:
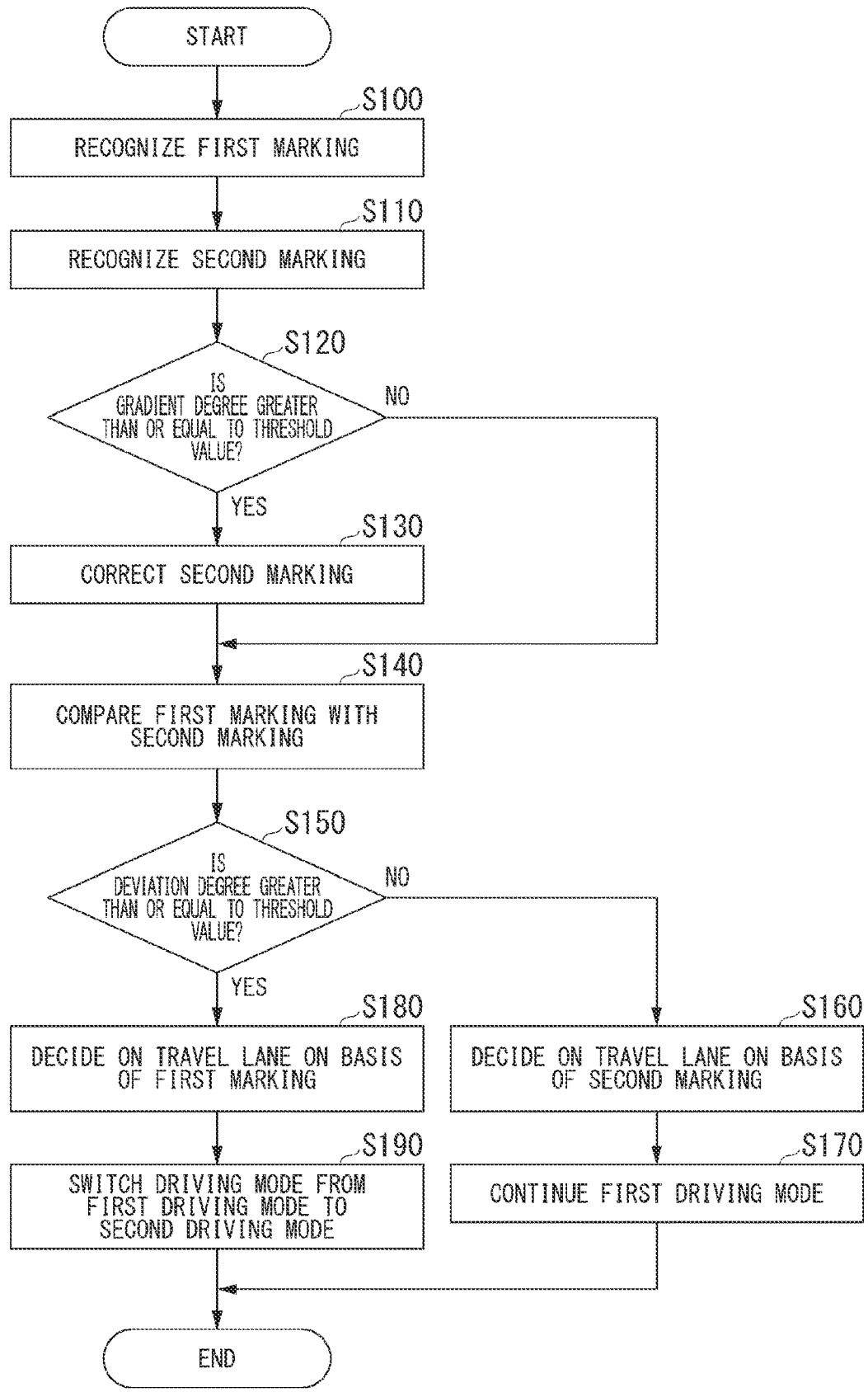
FIG. 8 is a flowchart showing an example of a flow of a process executed by an automated driving control device.

Next, a flow of a process executed by the automated driving control device 100 according to the embodiment will be described. FIG. 8 is a flowchart showing an example of the flow of the process executed by the automated driving control device 100. Hereinafter, a process of deciding on the travel lane or switching the driving mode of the vehicle M on the basis of a deviation degree between the markings recognized by the first recognizer 132 and the second recognizer 134 among processes executed by the automated driving control device 100 will be mainly described. In the vehicle M, it is assumed that the driving control based on the first driving mode (for example, mode A) is executed. In the following process, in the determination result of the driver state determiner 152, the driver's state is assumed to be a state suitable for the mode being executed or the mode after switching (i.e., a situation in which the mode is not switched on the basis of the determination result of the driver state determiner 152). The process shown in FIG. 8 may be iteratively executed at a prescribed timing.

In the example of FIG. 8, the first recognizer 132 recognizes a first marking for defining the travel lane of the vehicle M on the basis of the output of the detection device DD (step S100). Subsequently, the second recognizer 134 recognizes a second marking for defining the travel lane of the vehicle M with reference to map information on the basis of the position information of the vehicle M obtained from the position detector (step S110). The processing of steps S100 and S110 may be performed in reverse order or in parallel.

Subsequently, the corrector 136 acquires road gradient information in the travel direction of the vehicle M and determines whether or not the gradient degree included in the acquired road gradient information is greater than or equal to the threshold value (step S120). When it is determined that the gradient degree is greater than or equal to the threshold value, the corrector 136 corrects the second marking through coordinate conversion or the like (step S130).

After the processing of step S130 or in the processing of step S120, when it is determined that the gradient degree is not greater than or equal to the threshold value, the determiner 154 compares the first marking with the second marking (a corrected second marking when a correction process of the corrector 136 has been performed) (step S140) and determines whether or not the deviation degree between the first marking and the second marking is greater than or equal to the threshold value (step S150). When it is determined that the deviation degree is not greater than or equal to the threshold value (or less than the threshold value), the lane decider 156 determines the travel lane of the vehicle M on the basis of the second marking (step S160). Subsequently, the mode change processor 158 performs a process of continuing the first driving mode and causing the vehicle M to travel in the decided travel lane (step S170). When it is determined that the deviation degree is greater than or equal to the threshold value in the processing of step S150, the lane decider 156 decides on the travel lane of the vehicle M on the basis of the first marking (step S180). Subsequently, the mode change processor 158 switches the driving mode from the first driving mode to the second driving mode and performs a process of causing the vehicle M to travel in the decided travel lane (step S190). Thereby, the process of the present flowchart ends.

[Modified Example]

In the embodiment, when the vehicle M is located in a gradient segment (when the vehicle M passes through a gradient change point where the gradient degree changes) and when there is no gradient change point within a prescribed distance in a travel direction of the vehicle M, the corrector 136 can suppress the correction of the second marking even if the gradient degree of the road during traveling is greater than or equal to the threshold value. Suppressing the correction includes preventing correction and making a correction amount smaller than a standard. When there is no gradient change point in the travel direction of the vehicle M traveling on a sloping road, even if there is a road gradient, because it is a flat road surface when viewed from the vehicle M, the above-described correction process can be suppressed in this case and therefore more appropriate correction can be performed.

The corrector 136 may correct the first markings LL1 and RL1 instead of (or in addition to) the second markings LL2 and RL2 on the basis of the road gradient information in the travel direction of the vehicle M.

According to the above-described embodiment, a vehicle control device includes the first recognizer 132 configured to recognize a first marking for defining a travel lane of a vehicle M on the basis of an output of the detection device DD that has detected a surrounding situation of the vehicle M, the second recognizer 134 configured to recognize a second marking for defining the travel lane on the basis of position information and map information of the vehicle M, the corrector 136 configured to correct the second marking on the basis of road gradient information of a travel direction of the vehicle M, and the lane decider 156 configured to decide on a travel lane of the vehicle M on the basis of a comparison result between the first marking and the second marking corrected by the corrector 136, whereby it is possible to more appropriately decide on the travel lane of the vehicle.

According to the embodiment, it is possible to suppress the deviation caused by the road gradient change and make the more appropriate deviation determination by correcting the second marking obtained from the map information on the basis of the road gradient information and comparing the corrected second marking with the first marking. Thereby, the deviations due to map accuracy (or a map difference), camera performance, or the like can be accurately ascertained. According to the embodiment, the accuracy of lane decision can be improved in highly accurate deviation determination. Especially in the field of automated driving, because a target trajectory corresponding to the lane in which the vehicle M will travel in the future is generated and driving control is executed along the target trajectory, more appropriate driving control can be implemented by improving the accuracy of lane decision. Thus, the embodiment can contribute to the development of a sustainable transport system.

The embodiment described above can be represented as follows.

A vehicle control device including:
a storage medium storing computer-readable instructions: and
a processor connected to the storage medium, the processor executing the computer-readable instructions to:
recognize a first marking for defining a travel lane of a vehicle on the basis of an output of a detection device that has detected a surrounding situation of the vehicle:
recognize a second marking for defining the travel lane on the basis of position information and map information of the vehicle;
correct the second marking on the basis of road gradient information of a travel direction of the vehicle; and
decide on a travel lane of the vehicle on the basis of a comparison result between the first marking and the corrected second marking.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A vehicle control device comprising:
a first recognizer configured to recognize a first marking that defines a travel lane of a vehicle on a basis of an output of a detection device that has detected a surrounding situation of the vehicle;
a second recognizer configured to recognize a second marking that defines the travel lane on a basis of position information and map information of the vehicle;
a corrector configured to correct the second marking on a basis of first road gradient information of a travel direction of the vehicle, resulting in a corrected second marking;
a lane decider configured to decide on a travel lane of the vehicle on a basis of a comparison result between the first marking and the corrected second marking; and
a driving controller configured to, on a basis of the travel lane decided on by the lane decider, execute driving control that controls at least one of steering of the vehicle or a speed of the vehicle.

2. The vehicle control device according to claim 1, wherein the corrector corrects a position of the second marking further on a basis of second road gradient information of the second marking included in the map information.

3. The vehicle control device according to claim 1, wherein the corrector is further configured to correct the travel lane of the vehicle defined by the second marking, on the basis of the first road gradient information.

4. The vehicle control device according to claim 1, wherein the driving control comprises:
a first driving mode, and
a second driving mode having at least one of:
a heavier task imposed on a driver of the vehicle than the first driving mode, or
having a lower driving assistance degree for the driver than the first driving mode, and
wherein the driving controller switches the driving mode from the first driving mode to the second driving mode when, in a state in which the first driving mode is being executed, a deviation degree between the first marking and the second marking is greater than or equal to a threshold value.

5. The vehicle control device according to claim 1, wherein the corrector corrects the second marking when a gradient degree included in the first road gradient information is greater than or equal to a threshold value.

6. The vehicle control device according to claim 1, wherein the corrector is further configured to suppress correction of the second marking when:
the vehicle is located in a gradient segment, and
a gradient change point is not located within a prescribed distance in the travel direction of the vehicle.

7. A vehicle control method comprising:
on a basis of an output of a detection device, representative of a surrounding situation of a vehicle, recognizing, by a computer, a first marking that defines a travel lane of the vehicle;
on a basis of position information and map information of the vehicle, recognizing, by the computer, a second marking for defining that further defines the travel lane;
on the basis of the first road gradient information, correcting, by the computer, the second marking, resulting in a corrected second marking;
on a basis of a comparison result between the first marking and the corrected second marking, determining, by the computer, a determined travel lane of the vehicle; and
on a basis of the determined travel lane, executing driving control of the vehicle to control at least one of steering of the vehicle or a speed of the vehicle.

8. A computer-readable non-transitory storage medium storing a program for causing a computer to:
recognize a first marking for defining a travel lane of a vehicle on a basis of an output of a detection device that has detected a surrounding situation of the vehicle;
recognize a second marking for defining the travel lane on a basis of position information and map information of the vehicle;
correct the second marking on a basis of road gradient information of a travel direction of the vehicle, resulting in a corrected second marking;
decide on a travel lane of the vehicle on a basis of a comparison result of comparing the first marking and the corrected second marking; and
execute driving control of the vehicle to control at least one of steering of the vehicle or a speed of the vehicle.

* * * * *